United States Patent
Mast et al.

(10) Patent No.: US 8,226,030 B2
(45) Date of Patent: Jul. 24, 2012

(54) WEIGHT-ON-GEAR SENSOR

(75) Inventors: James Grant Mast, Burleson, TX (US); Charles Eric Covington, Colleyville, TX (US); Paul Eugene Darden, Arlington, TX (US); William L. McKeown, Euless, TX (US)

(73) Assignee: Textron Innovations Inc., Providence, RI (US)

( * ) Notice: Subject to any disclaimer, the term of this patent is extended or adjusted under 35 U.S.C. 154(b) by 266 days.

(21) Appl. No.: 12/640,064

(22) Filed: Dec. 17, 2009

(65) Prior Publication Data
US 2010/0095788 A1    Apr. 22, 2010

Related U.S. Application Data

(62) Division of application No. 11/659,748, filed on Feb. 8, 2007, now Pat. No. 7,637,459.

(51) Int. Cl.
*B64C 25/52* (2006.01)
(52) U.S. Cl. ..................... 244/108; 244/100 R
(58) Field of Classification Search .......... 244/108, 244/85 R, 100 R
See application file for complete search history.

(56) References Cited

U.S. PATENT DOCUMENTS

| | | | |
|---|---|---|---|
| 4,020,911 A * | 5/1977 | English et al. | 177/136 |
| 4,215,754 A | 8/1980 | Hagedorn et al. | |
| 4,269,070 A | 5/1981 | Nelson et al. | |
| 4,270,711 A | 6/1981 | Cresap et al. | |
| 4,574,360 A * | 3/1986 | Bateman | 702/174 |
| 4,685,338 A | 8/1987 | Bonfils | |
| 4,850,552 A | 7/1989 | Darden et al. | |
| 5,045,649 A | 9/1991 | Ramsey et al. | |
| 5,205,514 A | 4/1993 | Patzig et al. | |
| 5,257,756 A | 11/1993 | Patzig et al. | |
| 6,273,613 B1 * | 8/2001 | O'Brien et al. | 384/448 |
| 6,590,168 B2 | 7/2003 | Kawaguchi et al. | |

OTHER PUBLICATIONS

International Search Report for PCT/US04/25821 dated Nov. 1, 2005.
Office Action in CN counterpart Application No. 200480043730.4, issued by Patent Office of China, Jan. 4, 2008.
U.S. Office Action for U.S. Appl. No. 11/659,748 issued on May 26, 2009.

* cited by examiner

*Primary Examiner* — Tien Dinh
(74) *Attorney, Agent, or Firm* — James E. Walton; Noah A. Tevis

(57) ABSTRACT

A weight-on-gear sensor for use on an aircraft with landing skids having a bracket and a displacement sensor attached to the bracket is disclosed. The bracket has a center member connecting a first end member to a second end member. The center member has a centerline and the end members extend from the centerline of the center member. Mounting members extend along the centerline of the center member to facilitate attachment of the bracket to a cross tube. The displacement sensor connects the first end member to the second end member. The displacement sensor is parallel to, and offset from, the centerline of the center member so that when a bending moment is applied to the center member the first displacement sensor is either elongated or shortened.

20 Claims, 2 Drawing Sheets

WEIGHT-ON-GEAR SENSOR

CROSS REFERENCE TO RELATED APPLICATIONS

This application is a Divisional of U.S. application Ser. No. 11/659,748, having a filing date or 371(c) date of 8 Feb. 2007, titled "WEIGHT-ON-GEAR SENSOR", which was the National Stage of International Application No. PCT/US2004/025821, filed on 10 Aug. 2004. U.S. application Ser. No. 11/659,748 is hereby incorporated by reference for all purposes as if fully set forth herein.

BACKGROUND

1. Technical Field

The present application relates to sensors for aircraft. In particular, the present application relates to weight-on-gear sensors for aircraft with landing skids.

2. Description of Related Art

For a multitude of reasons it is important for various aircraft systems to know if the aircraft is on the ground or in the air. This is referred to in this application as "weight-on-gear" status. For the purposes of this application, "positive" weight-on-gear status means that the aircraft has landed on a surface, and "negative" weight-on-gear status means that the aircraft is airborne. One reason this is important is the desire to disable, or adjust, the operation of weapons systems, or other systems, while the aircraft is on the ground. Because an aircraft may land on a variety of surfaces, it is important that the system used to determine if the aircraft is in flight is not easily damaged, confused, or circumvented by uneven surfaces or unusually high or low friction surfaces.

Some complex systems have been developed to determine whether an aircraft with opposite landing skids is in the air. Some of these systems measure the deflection of one of the cross tubes that connect the landing skids to the fuselage of the aircraft. This sort of system depends on the cross tube and aircraft maintaining tight tolerances over the life of the system. One problem with these systems is that unusually hard landings can deform either the fuselage or the cross tube, making systems that are dependent on this physical relationship unreliable.

Other systems use delicate strain gage sensors on the structural members of the landing gear. The main problem with these systems is that these sensors are easily damaged by harsh environments and therefore not suitable for extended service.

Yet other systems use complex sensors with low tolerances in very limited ranges of operation. Once the range of operation is exceeded, such as by a hard landing or large swing in temperature, the sensor is not able to reliably track further operation of the aircraft.

As might be expected, the above systems may be very expensive either due to initial cost or the high cost associated with frequent maintenance or replacement.

BRIEF DESCRIPTION OF THE DRAWINGS

The novel features believed characteristic of the application are set forth in the appended claims. However, the application itself, as well as, a preferred mode of use, and further objectives and advantages thereof, will best be understood by reference to the following detailed description when read in conjunction with the accompanying drawings, wherein:

DETAILED DESCRIPTION OF THE PREFERRED EMBODIMENT

There is a need for a weight-on-gear sensor that can accurately and reliably determine the weight-on-gear status of the aircraft through large changes in temperature, hard landings and slight damage to the aircraft. In short, a robust system is desired that is reliable under harsh operating conditions and affordable in operation.

The present application discloses an aircraft having opposite landing skids connected to the fuselage by a cross tube and a self contained weight-on-gear sensor. The cross tube typically is located near the bottom of the fuselage of the aircraft. A self-contained weight-on-gear sensor for sensing the flexure of the cross tube is operably associated with the cross tube.

According to the present application, a weight-on-gear sensor for use on an aircraft with landing skids has a bracket and a displacement sensor attached to the bracket. The bracket has a center member connecting a first end member to a second end member. The center member has a centerline and the end members extend from the centerline of the center member. Mounting members extend along the centerline of the center member to facilitate attachment of the bracket to a cross tube. The displacement sensor connects the first end member to the second end member. The displacement sensor is parallel to, and offset from, the centerline of the center member so that when bending flexure of the center member occurs, the first displacement sensor is either elongated or shortened.

A second displacement sensor may be used as well. The second displacement sensor may be placed alongside the first to provide a redundant system, or it may be placed opposite the first displacement sensor to provide a system that can self correct for temperature changes.

The weight-on-gear sensor may be attached to the cross tube along the centerline of the cross tube to accurately record any flexure of the cross tube as an indication of weight-on-gear status. The weight-on-gear sensor has a wide range of operation that allows it to provide useful data even if the landing skids or cross tube are damaged. The wide range of operation also allows the weight-on-gear sensor to compensate for changes in temperature.

The present application provides several significant advantages, including: (1) accurate and reliable indication of weight-on-gear status; (2) wide range of operational environment conditions; (3) ability to indicate landing gear damage; (4) operational redundancy; and (5) adaptable to a wide range of landing gear configurations, sizes, stiffness, and other design characteristics.

The present application represents the discovery that linear motion sensors may be used to accurately determine the weight-on-gear status of an aircraft in a wide range of operational conditions. A weight-on-gear sensor according to the present application is particularly useful in applications where an aircraft has opposite landing skids connected by a cross tube.

Figure 1:
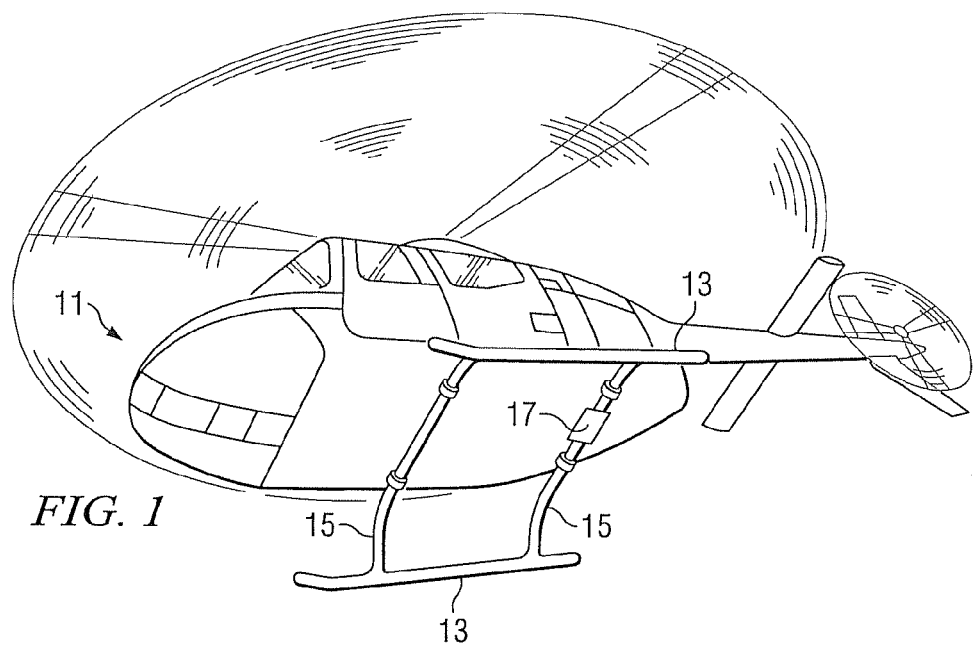
FIG. 1 is a perspective view of an aircraft with opposite landing skids attached by a cross tube.

Referring to FIG. 1 in the drawings, the preferred embodiment of an aircraft 11 with landing skids 13 connected by a cross tube 15 having a weight-on-gear sensor 17 according to the present application is illustrated. Weight-on-gear sensor 17 provides data to the flight control computer (not shown), or FCC, onboard aircraft 11. The data provided allows the flight control computer to accurately determine the weight-on-gear status of aircraft 11. For example, if the weight-on-gear status is indicated as positive, aircraft 11 is being supported by landing skids 13. Otherwise, if the weight-on-gear status is negative, aircraft 11 is not being supported by landing skids 13. The weight-on-gear status may be used alone, or in combination with other data, to determine whether aircraft 11 is airborne and whether certain systems should be disabled or adjusted in accordance with this information.

Figure 2:
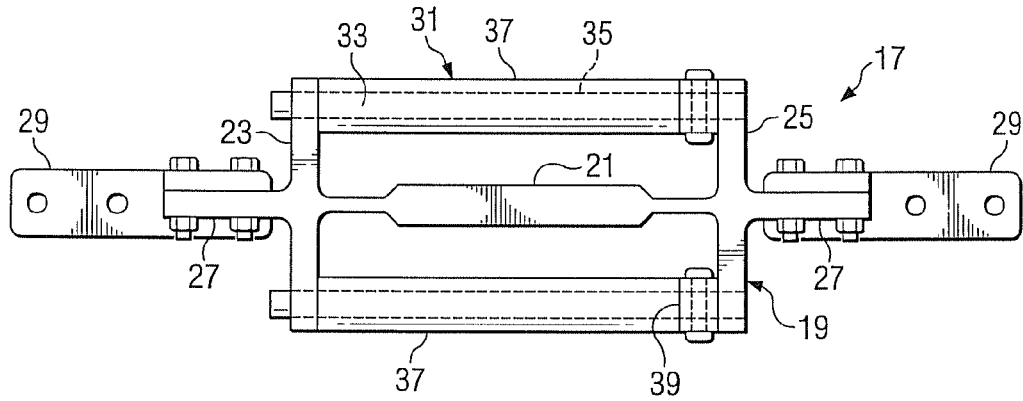
FIG. 2 shows a weight-on-gear sensor.

Referring to FIG. 2 in the drawings, a weight-on-gear sensor 17 is shown in greater detail. Weight-on-gear sensor 17 has a bracket 19 that is formed of a center member 21 extending between a first end member 23 and a second end member 25. Mounting members 27 are shown attached to fittings 29. Displacement sensors 31 are attached to end members 23 and 25 and positioned parallel to center member 21.

As is detailed in FIG. 2, each displacement sensor 31 may be comprised of a linear motion sensor 33 attached to a connecting rod 35. Sensors 31 are optionally protected by the combination of a guard tube 37 and dust boot 39. Linear motion sensor 33 may be a Linear Variable Differential Transformer (LVDT), a spring and load cell, or any sensor that can accurately and reliably indicate linear movement over a relatively short range with little, or low, susceptibility to interference. It has been found that hermetically sealed LVDT's generally available from Schaevitz Sensors under the trade designation HCA Series meet the demands of this service. The guard tube 37 and dust boot 39 are used to further protect the connecting rod 35 and linear motion detector 33 from damage or corrosion.

Figure 3:
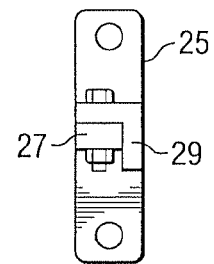
FIG. 3 is an end view of the weight-on-gear sensor of FIG. 2.

Referring now to FIG. 3 in the drawings, an end view of weight-on-gear sensor 17 is shown detailing the interface between mounting member 27 and fitting 29. As shown in FIGS. 2 and 3, mounting members 27 may be secured to fittings 29 with nuts and bolts as well as adhesive bonding. Other fastening means may be used that provide an adequate bond between mounting members 27 and fittings 29 to transmit any bending moments acting on cross tube 15 due to supporting aircraft 11 on landing skids 13. Cross tube 15 of the preferred embodiment has a generally rectangular tubular cross-section. Therefore, fittings 29 are adapted to attach weight-on-gear sensor 17 to a rectangular cross tube 15. Fittings 29 may be adapted to fit a cross tube 15 of any profile, including solids or tubes with I-beam, oval, polygonal or round cross sections. Furthermore, it is clear from FIG. 2 that fittings 29 are adapted to be fastened to cross tube 15 via rivets, nuts and bolts, or other appropriate fastening means that transmit the bending moment acting on cross tube 15 due to supporting aircraft 11 on landing skids 13.

Bending moments acting on cross tube 15 due to supporting aircraft 11 on landing skids 13 tend to move the center of cross tube 15 vertically. For example, as the weight of aircraft 11 is applied to landing skids 13, the center of cross tube 15 flexes downward slightly. The amount of flexure may depend on several factors, such as the friction between the landing surface and landing skids 13, the structural condition of landing skids 13, the weight of any payload, or the ambient temperature. Therefore, weight-on-gear sensor 17 measures the flexure of cross tube 15, without reference to other structural members, to indicate the weight-on-gear status of aircraft 11.

Figure 4:
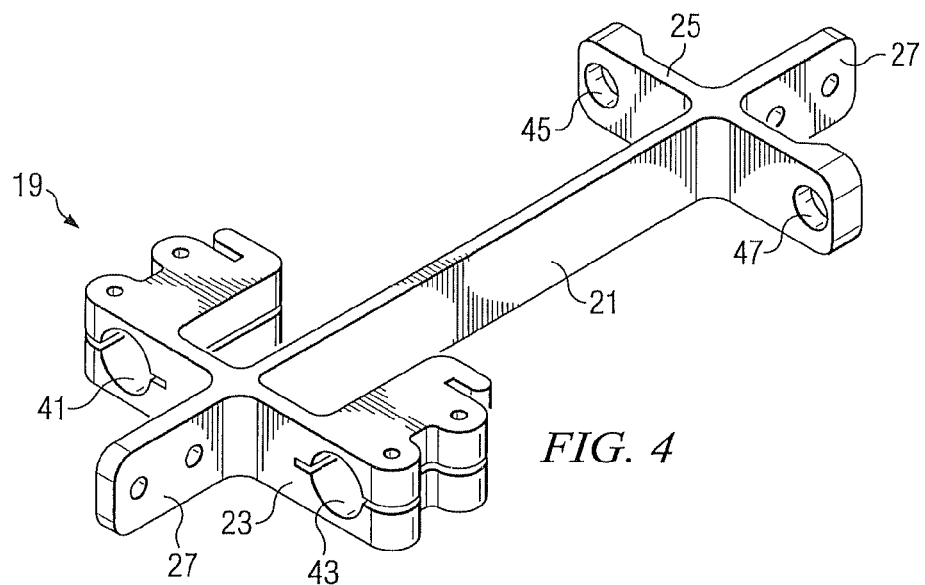
FIG. 4 shows a bracket used in the weight-on-gear sensor similar to that shown in FIG. 2.
Figure 6B:
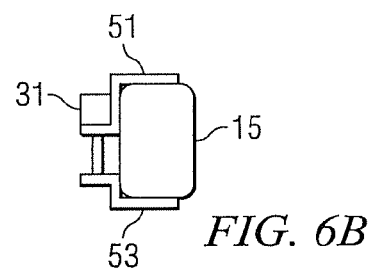
FIG. 6 depicts a weight-on-gear sensor of an alternative embodiment.

Referring now to FIG. 4 in the drawings, bracket 19 is shown without displacement sensors 31 or fittings 29. Bracket 19 of FIG. 4 is slightly different from bracket 19 of FIG. 2, as can be seen by the shape of center member 21. The shape and cross section of center member 21 may be adjusted for various applications based on the bending moment expected in cross tube 15 and the range of motion of displacement sensors 31. Furthermore, FIG. 4 provides a clearer view of a first sensor mount 41 and a second sensor mount 43, both in first end member 23. Likewise, a first rod mount 45 and a second rod mount 47 are both located in second end member 25. In this regard, the general configuration of displacement sensors 31 in FIG. 2 would be similar to the general configuration of displacement sensors 31 used with bracket 19 of FIG. 4.

Figure 5A:
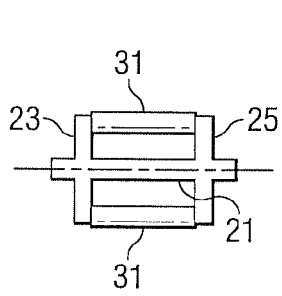
FIG. 5A depicts the configuration of the weight-on-gear sensor.
Figure 5B:
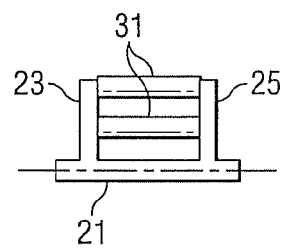
FIG. 5B depicts another configuration of a weight-on-gear sensor.
Figure 5C:
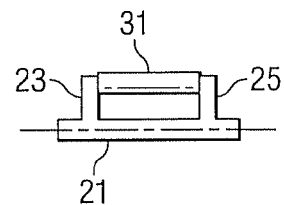
FIG. 5C depicts yet another configuration of a weight-on-gear sensor.

Referring now to FIGS. 5A, 5B, and 5C in the drawings, various configurations of displacement sensors 31 are illustrated. The displacement sensors 31 all extend between first end member 23 and second end member 25. In FIG. 5C the displacement sensor 31 is positioned offset from the centerline of cross tube 15 to measure the flexure of cross tube 15. In FIG. 5B two displacement sensors 31 are positioned on the same side of the centerline of cross tube 15 to provide a redundant reading of the flexure of cross tube 15. In FIG. 5A displacement sensors 31 are positioned above and below the centerline of cross tube 15 to provide sufficient data for a self adjusting indication of the flexure of cross tube 15. The orientation of the displacement sensors 31 is not indicated because each displacement sensor 31 may be positioned with the linear motion sensor 33 at the first end member and the connecting rod 35 at the second end member, vice versa.

FIG. 5A shows weight-on-gear sensor 17 where two displacement sensors 31 are positioned opposite one another relative to center member 21. The weight-on-gear status of the aircraft 11 is determined by comparing the data from the displacement sensors 31. If the tops displacement sensor 31 is shortened while the lower displacement sensor 31 is elongated, a bending moment in the cross tube consistent with a positive weight-on-gear status of the aircraft 11 is indicated. Furthermore, if both are elongated or shortened by a similar amount this can be an indication of a significant temperature change or a change in structural integrity of the cross tube 15 or landing skids 13 due to yielding or failure.

FIG. 5B shows weight-on-gear sensor 17 with two displacement sensors 31 both on the same side of the center member 21. Shortening of the displacement sensor 31 is an indication of a positive weight-on-gear status. This provides for a redundant system where the values from the two sensors may be compared to determine whether one of the sensors is failing.

FIG. 5C shows weight-on-gear sensor 17 with a single displacement sensor 31 positioned parallel to the center member 21. The weight-on-gear sensor of FIG. 5c provides a low cost simple solution which provides weight-on-gear status of the aircraft. Shortening of the displacement sensor 31 is an indication of a positive weight-on-gear status.

Furthermore, the weight-on-gear sensors of FIGS. 5B and 5C may be inverted such that the lengthening of displacement sensors 31 would be indicative of a positive weight-on-gear status.

Figure 6A:
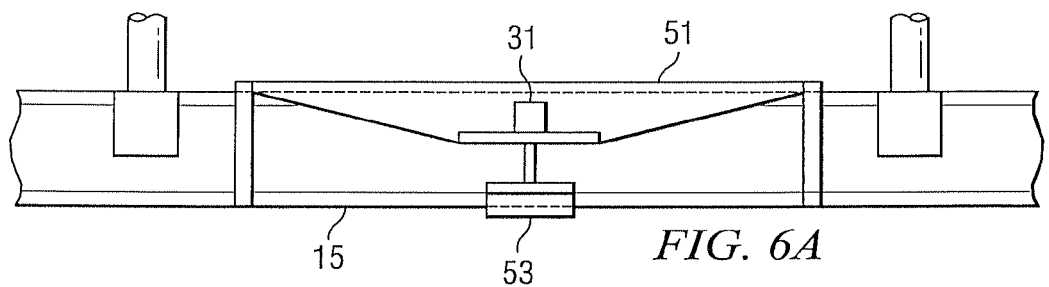

Referring to FIG. 6A in the drawings, an alternative embodiment is shown wherein the vertical flexure of cross tube 15 is indicated by displacement sensor 31 attached to a brace 51 and a tube mount 53. Brace 51 is attached at two points spaced along the length of cross tube 15 so that flexure of cross tube 15 between the two points may be measured as a vertical displacement by vertically aligned displacement sensor 31. Again, the flexure is measured in cross tube 15 independent of the position of cross tube 15 relative to the remaining structure of aircraft 11. The orientation of displacement sensor 31 may be upright or inverted, and multiple displacement sensors 31 may be used to create a redundant system.

Displacement sensors 31 generate a signal relative to the displacement of displacement sensors 31. A logic computer 49 interprets the signal to indicate the weigh-on-gear status of the aircraft 11. One embodiment uses a logic structure that allows the weight-on-gear sensor 17 to indicate the weight-on-gear status of the aircraft over a wide variety of conditions without undue calibration.

Logic computer 49 is associated with memory that allows the storage of variables and values related to the weight-on-gear sensor. The memory is preferably non-volatile in nature. Logic computer 49 receives signals from displacement sensors 31 and continuously compares the signals to a range of acceptable values stored in memory. If the signals are not within the pre-selected range of acceptable values the logic computer indicates a failure of weight-on-gear 17. This sort of failure may be due to the displacement sensor 17 being beyond its useful range, or the failure of electrical components or wiring.

Logic computer 49 saves a signal value for each weight-on-gear status, positive and negative. The signal from displacement sensor 31 is compared to these saved values to indicate a weight-on-gear status as well as to update the saved values. For instance, upon new installation of the weight-on-gear sensor 17 the positive weight-on-gear value saved may be blank or outside the acceptable signal range. If the signal received from the weight-on-gear sensor is within the acceptable range the signal received will be saved as the weigh-on-gear positive value because it is assumed that aircraft 11 is on the ground when the weigh-on-gear sensor is installed and activated.

Logic computer 49 is also connected to other information about the flight status of aircraft 11, such as the position of control sticks, primary airspeed, secondary airspeed, ground speed, and elevation. These other indicators may be used to confirm the indication of weight-on-gear status. For example, if any of these indicators are above certain thresholds for more than a few seconds it can be assumed that aircraft 11 is in fact in the air. At this point, the signal being received from the weight-on-gear sensor may be saved as the weight-on-gear negative value.

From this point, whenever the signal from displacement sensor 31 is within a preset range of the weight-on-gear positive value, logic computer 49 may indicate weight-on-gear status as positive. And whenever the signal from displacement sensor 31 is within a present range of the weigh-on-gear negative value, logic computer 49 may indicate weight-on-gear status as negative. But, it is assumed that repeated landings, changes in landing surface, or changes in temperature will change the amount of flexure in cross tube 15, and therefore the signal from displacement sensor 31. Therefore, adjustments are continually made to the values saved as weight-on-gear positive and weight-on-gear negative.

For example, when the signal from displacement sensor 31 is within a preset range of the weight-on-gear positive value, logic computer may reset the weight-on-gear positive value to the new signal. The same may be done for the weight-on-gear negative value. This compensates for slow changes in both aircraft 11 and weight-on-gear sensor 17.

Where more abrupt changes are encountered, the signal will be outside the preset range for both the weight-on-gear positive and the weigh-on-gear negative values. By reference to the other aircraft data the weight-on-gear status may be determined and new values are saved. For example, if the signal is outside ranges and the airspeed is greater than 60 miles per hour and the radar altitude is greater than 20 feet for more than a few seconds, logic computer 49 may reset the weight-on-gear value to the new signal. Likewise, if the new signal is out of ranges and the airspeed is less than 10 miles per hour and the radar altitude is less than 10 feet for more than a few seconds, logic computer 49 may reset the weight-on-gear positive value to the new signal.

The above signals are sampled and averaged over time to eliminate noise from vibration and other sources. The time used for computing the running average may be in the range of 2 to 3 seconds.

It is apparent that an application with significant advantages has been described and illustrated. Although the present application is shown in a limited number of forms, it is not limited to just these forms, but is amenable to various changes and modifications without departing from the spirit thereof.

We claim:

1. An aircraft, comprising:
   opposing landing skids connected by a cross tube; and
   a weight-on-gear sensor attached to the cross tube, the weight-on-gear sensor comprising:
       a bracket with a center member connecting a first end member to a second end member the center member having a centerline and the end members extending from the centerline of the center member, mounting members extending along the centerline of the center member; and
       a first displacement sensor connecting the first end member to the second end member, the first displacement sensor being parallel to, and offset from, the centerline of the center member such that when a bending moment is applied to the center member the first displacement sensor is either elongated or shortened.

2. The aircraft according to claim ,1 further comprising:
   a second displacement sensor connecting the first end member to the second end member, the second displacement sensor being parallel to, and offset from, the centerline of the center member.

3. The aircraft according to claim 2, wherein the second displacement sensor is on the same side of the centerline of the center member as the first displacement sensor such that when a bending moment is applied to the center member both the first displacement sensor and the second displacement sensor, are either elongated or shortened.

4. The aircraft according to claim 2, wherein the second displacement sensor is opposite the first displacement sensor with respect to the centerline, such that when a bending moment is applied to the center member if the first displacement sensor is elongated then the second displacement sensor is shortened, and if the first displacement sensor is shortened then the second displacement sensor is elongated.

5. The aircraft according to claim 2, wherein the first displacement sensor comprises:
   a linear motion sensor connected to the first end member; and
   a connecting rod connected to the second end member and the linear motion sensor;

wherein the second displacement sensor comprises:
  a linear motion sensor connected to the first end member; and
  a connecting rod connected to the second end member and the linear motion sensor.

6. The aircraft according to claim 2, wherein the first displacement sensor comprises:
  a linear motion sensor connected to the first end member; and
  a connecting rod connected to the second end member and the linear motion sensor;
  wherein the second displacement sensor comprises:
    a linear motion sensor connected to the second end member, and
    a connecting rod connected to the first end member and the linear motion sensor.

7. The aircraft according to claim 1, wherein the first displacement sensor comprises:
  a linear motion sensor connected to the first end member; and
  a connecting rod connected to the second end member and the linear motion sensor.

8. An aircraft, comprising:
  opposing landing skids connected by a cross tube;
  a bracket coupled to the cross tube through a first fitting and a second fitting, thereby defining a bracket length, the bracket length extending between the first fitting and the second fitting approximately parallel to the axis of the cross tube; and
  a first linear displacement sensor coupled to the bracket and positioned between the first fitting and the second fitting to detect flexure in the cross tube as an indication of weight-on-gear status;
  wherein a bending moment acting on the cross tube is transferred through the bracket to the first linear displacement sensor, the bending moment causing the bracket to flex between the first and the second fitting.

9. The aircraft according to claim 8, wherein the first linear displacement sensor is approximately parallel with a centerline of the cross tube.

10. The aircraft according to claim 9, further comprising:
  a second linear displacement sensor approximately parallel with the centerline of the cross tube, the second linear displacement sensor coupled to the bracket and positioned between the first fitting and the second fitting.

11. The aircraft according to claim 10, wherein the first linear displacement sensor is positioned above the centerline of the cross tube and the second linear displacement sensor is positioned below the centerline of the cross tube.

12. The aircraft according to claim 10, wherein the first linear displacement sensor and the second linear displacement sensor are positioned on the same side of the centerline of the cross tube.

13. The aircraft according to claim 8, wherein the first linear displacement sensor is configured to detect linear movement resulting from change in shape of the bracket.

14. The aircraft according to claim 8, wherein the first linear displacement sensor is either linearly compressed or linearly elongated when the cross tube is subjected to a change in load.

15. An aircraft, comprising:
  a cross tube included in a landing gear;
  a weight-on-gear sensor coupled to the cross tube, the weight-on-gear sensor comprising:
    a first fitting and a second fitting coupled to the cross tube;
    a first linear displacement sensor configured to detect bending flexure in the cross tube as an indication of weight-on-gear status, the first linear displacement sensor located between the first fitting and the second fitting; and
    a bracket extending between the first and the second fitting approximately parallel to the axis of the cross tube and configured to fixedly attach the first linear displacement sensor to the cross tube, the bracket being configured to flex in response to a bending moment acting on the cross tube;
  wherein the bending moment acting on the cross tube is transferred through the bracket to the first linear displacement sensor and is detected as a linear displacement by the first linear displacement sensor.

16. The aircraft according to claim 15, wherein the weight-on-gear sensor further comprises:
  a second linear displacement sensor attached to the bracket between the first and the second fittings and configured to function with the first linear displacement sensor to detect bending flexure in the cross tube as an indication of weight-on-gear status.

17. The aircraft according to claim 15, wherein the bracket comprises:
  a center member having a centerline.

18. The aircraft according to claim 15, wherein the first linear displacement sensor is either linearly compressed or linearly elongated when the cross tube is subjected to a change in load.

19. The aircraft according to claim 15, wherein the weight-on-gear sensor further comprises:
  a second linear displacement sensor attached to the bracket between the first and the second fittings and configured to detect bending flexure in the cross tube as an indication of weight-on-gear status.

20. The aircraft according to claim 19, wherein the first linear displacement sensor and the second linear displacement sensor are approximately parallel to each other.

* * * * *